(12) United States Patent
Tessicini et al.

(10) Patent No.: US 12,532,984 B2
(45) Date of Patent: Jan. 27, 2026

(54) DEVICE FOR THE PRODUCTION OF FOAM OF A LIQUID, PARTICULARLY OF A FOOD LIQUID SUCH AS MILK, COFFEE OR THE LIKE

(71) Applicant: FLUID-O-TECH S.R.L., Corsico (IT)

(72) Inventors: Fabrizio Tessicini, Imola (IT); Michele Norgia, Milan (IT); Diego Andreis, Milan (IT)

(73) Assignee: FLUID-O-TECH S.R.L., Corsico (IT)

( * ) Notice: Subject to any disclaimer, the term of this patent is extended or adjusted under 35 U.S.C. 154(b) by 482 days.

(21) Appl. No.: 16/943,566

(22) Filed: Jul. 30, 2020

(65) Prior Publication Data

US 2021/0030194 A1 Feb. 4, 2021

(30) Foreign Application Priority Data

Aug. 1, 2019 (IT) ......................... 102019000013656

(51) Int. Cl.
*A47J 31/44* (2006.01)
*A47J 31/41* (2006.01)
*A47J 31/52* (2006.01)

(52) U.S. Cl.
CPC .......... *A47J 31/4485* (2013.01); *A47J 31/41* (2013.01); *A47J 31/52* (2013.01)

(58) Field of Classification Search
CPC ........ A47J 31/4485; A47J 31/41; A47J 31/52; A47J 31/525; A47J 31/40; A47J 31/44; A47J 31/4403
See application file for complete search history.

(56) References Cited

U.S. PATENT DOCUMENTS 4,010,643 A 3/1977 Dekan
4,084,426 A 4/1978 Gales
(Continued)

FOREIGN PATENT DOCUMENTS

DE 10032371 A1 1/2002
EP 2363051 A1 9/2011
(Continued)

OTHER PUBLICATIONS

Dept of Food Science, "Stagnant surface behaviour and its effect on foam and film stability", pp. 1-2, ScienceDirect, Colloids and Surfaces A: Physicochemical and Engineering Aspects, Apr. 1999, vol. 149, Issues 1-3, Abstract.
(Continued)

*Primary Examiner* — Jimmy Chou
*Assistant Examiner* — Thao Uyen Tran-Le
(74) *Attorney, Agent, or Firm* — CANTOR COLBURN LLP

(57) ABSTRACT

A device for producing foam, particularly of a liquid such as milk or coffee, includes a liquid source, a source of air or another gas, a mixing device in fluid communication with the liquid source and air source adapted to mix the liquid coming from the liquid source with the air coming from the air source to generate a foam of the liquid. The device further includes a duct in fluid communication with the mixing device downstream of the mixing device, with the foam flowing along the duct in a flow direction. The device includes a foam sensor associated with the duct and a radiation source adapted to generate a radiation which strikes the duct along an irradiation direction incident to the (Continued)

flow direction. The foam sensor includes a first photodiode placed on the irradiation direction or a second photodiode placed along a diffusion direction.

7 Claims, 3 Drawing Sheets

(56) References Cited

U.S. PATENT DOCUMENTS

| | | | |
|---|---|---|---|
| 5,207,148 A | 5/1993 | Anderson et al. | |
| 7,867,386 B2 * | 1/2011 | Tunze | A01K 63/045 |
| | | | 210/167.26 |
| 10,568,454 B2 * | 2/2020 | Balkau | A47J 31/4489 |
| 2001/0032224 A1 * | 10/2001 | Tichenor | G06F 7/588 |
| | | | 708/250 |
| 2013/0063128 A1 * | 3/2013 | Seo | G01R 15/243 |
| | | | 324/96 |
| 2013/0209639 A1 * | 8/2013 | Larson | A23C 7/00 |
| | | | 99/453 |
| 2013/0273548 A1 * | 10/2013 | Mastromatteo | C12Q 1/6806 |
| | | | 435/6.12 |
| 2014/0197554 A1 * | 7/2014 | Bonsch | A47J 31/4485 |
| | | | 261/37 |
| 2014/0263398 A1 * | 9/2014 | Swerchesky | B67D 1/1422 |
| | | | 222/1 |
| 2015/0309497 A1 * | 10/2015 | Calvin | G05B 19/0423 |
| | | | 700/86 |
| 2017/0340161 A1 * | 11/2017 | Andreis | A47J 31/4489 |
| 2018/0066983 A1 * | 3/2018 | Piehler | H01S 3/0014 |
| 2018/0132653 A1 | 5/2018 | Nuss et al. | |
| 2018/0136174 A1 * | 5/2018 | Nakamura | G01N 30/84 |
| 2019/0275535 A1 * | 9/2019 | Mohanarangam | G01F 23/265 |
| 2019/0313935 A1 * | 10/2019 | Al-Ali | A61B 5/7225 |

FOREIGN PATENT DOCUMENTS

| | | | | |
|---|---|---|---|---|
| EP | 2628421 A1 * | 8/2013 | | A47J 31/4485 |
| EP | 2764806 A1 | 8/2014 | | |
| EP | 3248519 B1 | 11/2017 | | |
| JP | H0827864 B2 * | 3/1996 | | |
| WO | 2017082841 A1 | 5/2017 | | |

OTHER PUBLICATIONS

K. Borcherding et al., "Effect of foaming temperature and varying time/temperature-conditions of pre-heating on the foaming properties of skimmed milk", pp. 1-2, ScienceDirect International Dairy Journal, Apr. 2008, vol. 18, Issue 4, Abstract.

P. Walstra, "Principles of Foam Formation and Stability" Foams, Physics, Chemistry and Structure Springer Series in Applied Biology, Springer, London pp. 1-5, 2020.

Sapna Kamath et al. "The influence of temperature on the foaming of milk", pp. 1-2, ScienceDirect Internal Diary Journal, Oct.-Nov. 2008, vol. 18, Issues 10-11, Abstract.

Chinese Office Action for Application No. 202010757123.5, dated Feb. 28, 2024, 19 pages.

* cited by examiner

DEVICE FOR THE PRODUCTION OF FOAM OF A LIQUID, PARTICULARLY OF A FOOD LIQUID SUCH AS MILK, COFFEE OR THE LIKE

CROSS-REFERENCE TO RELATED APPLICATIONS

This application is related to, and claims the benefit of Italian Patent Application No. 102019000013656, filed on Aug. 1, 2019, the contents of which are herein incorporated by reference in their entirety.

TECHNICAL FIELD

The present disclosure relates to a device for the production of foam of a liquid, particularly a food liquid such as milk, coffee or the like, and to a foam sensor with which such a device can be equipped.

BACKGROUND

To date, the coffee industry is continuously expanding, both in the sector of public spaces such as bars and restaurants, and in the sector of domestic environments, thanks to the wide spread of coffee-making machines starting from coffee beans or coffee powder, both loose and in capsules.

In the coffee sector, milk is a strategic beverage since it is used for the preparation of many coffee-based beverages, such as cappuccinos or caffé macchiatos.

Milk is often served as a "foam", that is "frothed". For example, cappuccino is a hot beverage comprising a dose of espresso coffee to which a dose of frothed hot milk is added.

In this case the foam can be defined as a two-phase colloidal system in which air bubbles are dispersed in the liquid phase comprising milk.

The properties of the foam layer present in the upper part of the beverage contribute significantly to the overall quality of the beverage and to the appreciation thereof by the consumer. In fact, many properties of the beverage itself depend on the quality of the foam, such as the aesthetic appearance, the volume, the consistency, the sensation in the mouth. The method for releasing the aroma of the coffee also depends on the quality of the foam.

One of the most important properties of milk foam is physical stability. In fact, for beverages such as cappuccino, foam stability is required for the duration of the consumption time, generally equal to 10/15 minutes. In literature, Kamath et al. (2008a) and Borcherding et al. (2008a) describe the changes in the appearance of a foam of skimmed milk as a function of the maintenance time after foaming. Therefore, the distribution of the bubbles, the size of the bubbles and also the changes in shape they undergo depend on the stability of the gas bubbles in the foam.

The stability of the gas bubbles in the foam is defined by three processes: (i) coalescence of gas bubbles; (ii) disproportion of gas bubbles; and (iii) drainage of the liquid from the foam. Said processes are discussed in detail by Prins (1986) and Walstra (2003) and are summarized below.

The coalescence of gas bubbles decreases the number of gas bubbles in the foam and increases the size of the bubbles in the foam. The driving force behind the coalescence of gas bubbles is the stability of the liquid films among the droplets. In particular, the presence of fat in milk can play an important role in determining the stability of the liquid films due to the surfactant material from a drop of emulsion that is diffused on the surface of the liquid film that stabilises the air bubbles. The size of the bubbles plays a fundamental role in their subsequent coalescence.

In particular, bubbles with sizes between 2 and 4 microns are particularly susceptible to the coalescence phenomenon.

The disproportion of the gas bubbles causes coalescence of the same following the passage of gas from the smaller (at higher pressure) to the larger bubbles. As a result, the smaller bubbles get smaller and smaller, while the big ones get bigger and bigger. It is therefore essential to be able to check the uniformity of the diameter of the air bubbles that are present in the foam.

With regards to the drainage of the liquid from the foams, it can be described as the upward movement, "skimming", of air bubbles as a result of the difference in density between the air bubbles and the continuous phase; concomitantly, the continuous phase among the bubbles undergoes a downward movement. To prevent instability induced by the drainage in a foam, it is necessary to prevent the upward movement of the air bubbles. Increasing the viscosity of the surrounding liquid does not prevent drainage, but it can significantly reduce the drainage rate. It is therefore important to know the viscosity of the ingredients used in order to adapt the recipe for the preparation of the foam accordingly.

Especially in public spaces, the milk "frothing" operation is normally made by hand, directly by the bartender, by using a steam wand which allows to incorporate air, in the form of bubbles, inside the milk. However, this operation requires some attention as the whey proteins present in milk are surfactant but thermolabile compounds. The surfactant activity, by decreasing the surface tension of the fluid and therefore its surface rigidity, favours the frothing of the milk when air is introduced. Thermolability, on the other hand, determines the existence of a limit temperature, which in the case of milk is around 70° C., beyond which the whey proteins irreversibly deteriorate and lose their surfactant behaviour. By cooling the milk again below this temperature, whey proteins no longer regain their surfactant characteristic.

The presence of the aforementioned limit temperature is well known to the most expert operators in the sector. Vice versa, operators with little experience, when they encounter difficulties in obtaining milk frothing, normally insist on using the steam wand in an attempt to obtain the desired frothing. In this way, the milk is heated up beyond the limit temperature and is often brought to the boil. The increase in temperature and the disintegration of a large part of the protein material cause, on the one hand, an increase in surface tension and, on the other, the boiling of the milk, which leads to the formation of a foam made up of very large bubbles, which tend to vanish in a very short time.

Currently there are also automatic or semi-automatic devices for making milk foam, which generally make use of mixing means that allow the milk to incorporate air to make such foam. Said mixing means can for example include:
- steam wands of the type described for the manual milk frothing described above,
- pumps designed to suck milk and air and to mix milk and air to obtain a foam;
- stirrer members, possibly heated, which mix the milk present in a container to obtain a foam.

Whether operating manually or using automatic devices, the control of the process for obtaining the foam is very complex, precisely because of the inherent instability of the foam itself, whose formation and persistence depend on numerous factors related to both the process for obtaining the foam, as described above, and the properties, quality, composition of the milk and storage conditions of the milk.

A good milk foam must present air bubbles of a size such as to be practically not visible to the naked eye, that is, in the order of a few micrometers in diameter, it must be silky, of good consistency, persistent and flowing.

Currently there are some parameters that can be used to evaluate the quality of the milk foam, among which the following ones can be mentioned: "foamability", "foam stability", "air bubble size", "overrun".

Currently there are laboratory instruments that allow to analyse foams that are generated in special transparent cylinders to obtain information on their properties. Said laboratory instruments generally make use of electrical conductivity measurements or high-quality video image acquisitions.

To date, however, there are no devices or methods for the production of milk foam that allow obtaining consistently and repeatably a foam having desired quality characteristics.

For example, the foaming results of milk also depend a lot on the different types of milk that are processed (e.g., whole, skimmed, partially skimmed, long-life milk). Furthermore, it is difficult to froth soy milk, which is becoming increasingly popular, and it requires specific operations that do not correspond to those that are performed to froth milk of animal origin.

Furthermore, as is known, the presence of a layer of surface foam is currently highly appreciated, and increasingly in demand, even in, espresso or long, coffee with no milk. Even obtaining a coffee foam is subject to drawbacks similar to those described above with specific reference to milk foam.

SUMMARY

It is a primary task of the present disclosure to realise a device for the production of foam of a liquid, particularly of a food liquid such as milk, coffee or the like which overcomes the drawbacks and overcomes the limits of the prior art allowing to measure the quality characteristics of the foam.

Within the scope of this task, the present disclosure provides a device for the production of foam which allows to regulate the process for generating the foam itself in order to guarantee that it is produced with the desired quality characteristics.

The disclosure further provides a device for the production of foam which allows to obtain information on the presence, distribution and type of bubbles forming the foam, in order to guarantee also stability and repeatability of the mode for obtaining the foam itself.

In fact, as explained in the introductory part, since the perception of the quality of the beverage is strongly influenced by the quality of the foam present in the upper part of the beverage itself, knowing, and possibly varying if necessary, the characteristics of the foam is very important for making beverages of excellent quality in a repeatable and constant way.

The disclosure provides a device for the production of foam which is easy to manufacture and economically competitive if compared to the prior art.

The aforementioned task, as well as the aforementioned and other advantages which will become better apparent hereinafter, are achieved by providing a device for the production of foam of a liquid, particularly of a food liquid such as milk, coffee or the like, as well as by a foam sensor for such a device as recited in the claims.

Other features are envisaged in the dependent claims.

BRIEF DESCRIPTION OF THE DRAWINGS

Further characteristics and advantages will become clearer from the description of a preferred but not exclusive embodiment of a device for the production of foam of a liquid, particularly of a food liquid such as milk, coffee or the like, illustrated only in a non-limiting way with the aid of the attached drawings, in which.

DETAILED DESCRIPTION OF THE DRAWINGS

Figure 1:
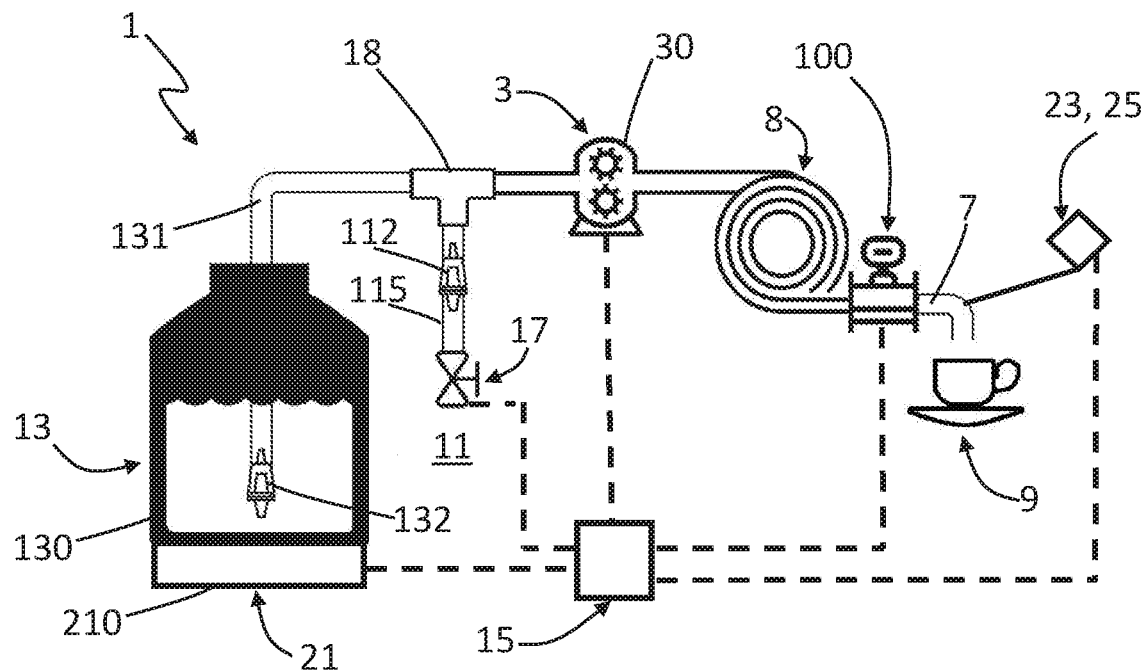
FIG. 1 is a schematic view of an embodiment of a device for the production of foam, according to the disclosure.

With reference to the aforementioned Figures, the device for the production of foam of a liquid, particularly of a food liquid such as milk, coffee or the like, indicated globally with the reference number 1, comprises:

a source of a liquid 13, such as preferably milk or milk-based liquids, or coffee;

a source of air 11 or another gas, a mixing device 3 in fluid communication with the liquid source 13 and with the air source 11 adapted to mix the liquid coming from the liquid source 13 with the air coming from the air source 11 to generate a foam of said liquid;

a duct 7 in fluid communication with the mixing device 3 downstream of the mixing device 3 itself, along which duct 7 the foam flows leaving the mixing device 3, according to a flow direction S.

The mixing of air and liquid which takes place thanks to the mixing device 3 allows to incorporate air, in the form of bubbles, inside the liquid in order to obtain a foam.

Advantageously, as better explained also hereinafter, the air source 11 can be constituted by the environment itself, i.e. by the ambient air which, for example through an inlet mouth, reaches the mixing device 3.

Figure 3:
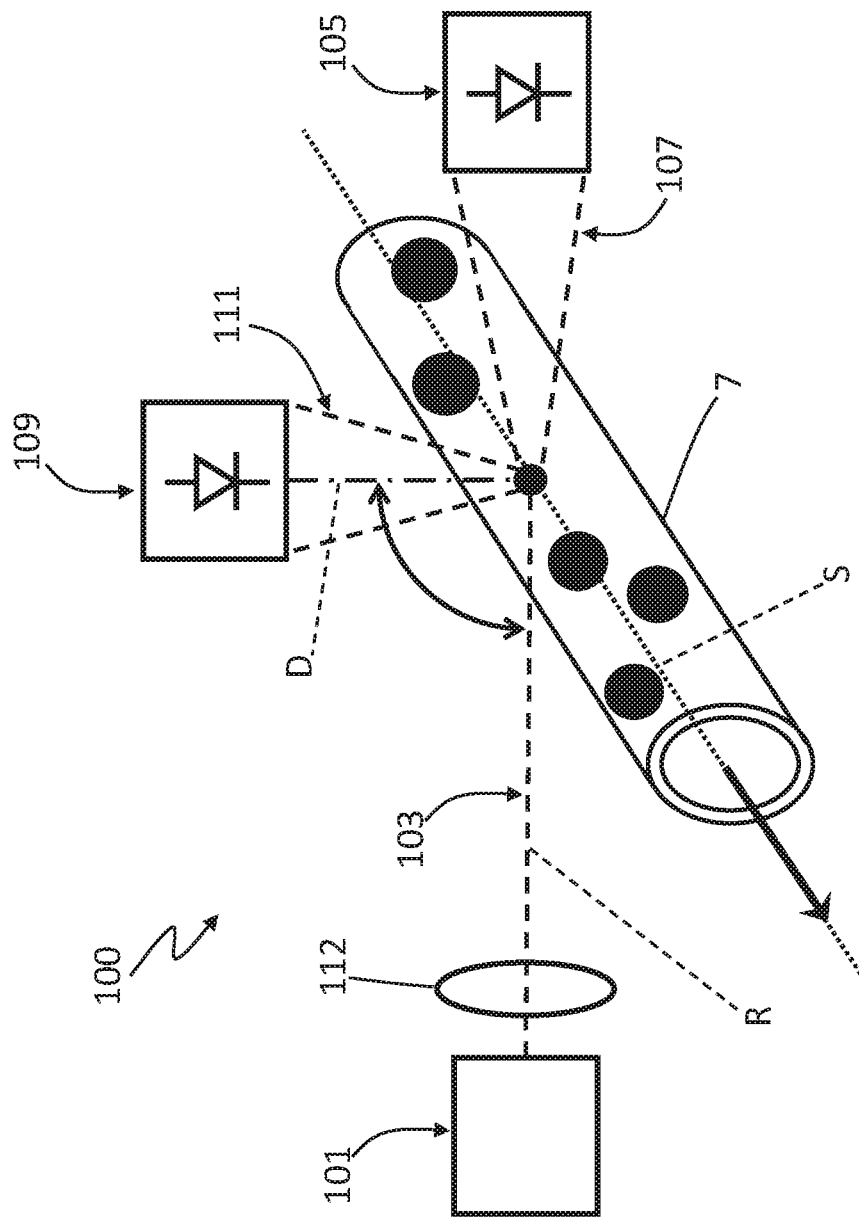
FIG. 3 schematically illustrates the operating principle of a foam sensor present in the device for the production of foam, according to the disclosure.
Figure 4:
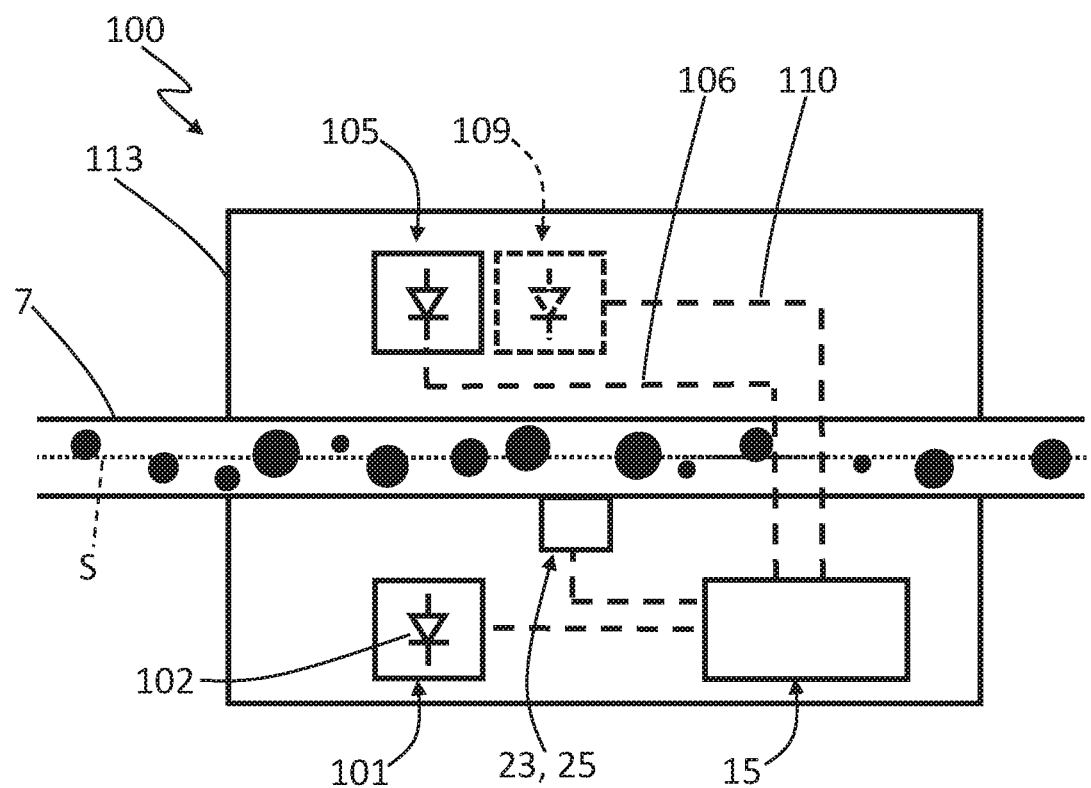
FIG. 4 is a schematic view of the foam sensor present in the device for the production of foam, according to the disclosure.

The foam flows along the duct 7 according to a flow direction indicated by S in FIGS. 3 and 4.

According to the disclosure, the device for the production of foam of a liquid 1 comprises a foam sensor 100 associated with the duct 7. Said foam sensor 100 comprises a radiation source 101 adapted to generate a radiation 103 which strikes the duct 7 along an irradiation direction R incident to said flow direction S.

According to the disclosure, the foam sensor 100 comprises:

a first photodiode 105 placed on said irradiation direction R from a side opposite to the radiation source 101 with respect to the duct 7, said first photodiode 105 generating a first electrical signal 106 dependent on the radiation portion 107 which passes through the foam which flows along said duct 7, or in alternative to this first photodiode 105, a second photodiode 109 placed along a diffusion direction D substantially orthogonal to the irradiation direction R, said second photodiode 109 generating a second electrical signal 110 dependent on the radiation portion 111 which is diffused by the foam along substantially said diffusion direction D.

Preferably, the foam sensor 100 comprises both the first photodiode 105 and the second photodiode 109.

The expression "flow direction S" means the direction along which the foam flows inside the duct 7, with particular reference to the portion of the duct 7 which is struck by the radiation 103 emitted by the radiation source 101. In the case in which the duct 7, in the portion of the same which is struck by the radiation 103, has a rectilinear trend, said flow direction S coincides, or is parallel, to the central axis of the duct 7. In the case in which the duct 7 has, precisely in the portion of the same which is struck by the radiation 103, a curvilinear trend according to a curved line, the expression "flow direction S" means the direction tangent to the curved line near the area of the duct 7 struck by the radiation 103.

The term "incident" means that the flow direction S and the irradiation direction R have a common point, that is, they intersect defining an angle greater than 0°.

Preferably the angle of incidence between the flow direction S and the irradiation direction R is substantially equal to 90°.

Advantageously, the duct 7, at least in the portion struck by the radiation 103 emitted by the radiation source 101, is transparent to said radiation 103.

The radiation 103 emitted by the radiation source 101 can be a radiation in the infrared, visible, or ultraviolet spectrum.

The radiation source 101 can comprise a photo-emitting diode 102, as schematically illustrated in FIG. 4, or a laser source.

Advantageously, the radiation source 101 can comprise a collimation optic 112.

Advantageously, the foam flowing along the duct 7 can reach an open end of the duct 7 and be collected in a container body 9. The container body 9 can be constituted for example by a coffee or cappuccino cup, possibly already containing coffee, or by a jug where the milk foam is collected to be added to the coffee or cappuccino.

Advantageously the device for the production of foam 1 comprises a processing and control unit 15 connected to the foam sensor 100 so as to receive and process the first electrical signal 106 generated by the first photodiode 105 and/or the second electrical signal 110 generated by the second photodiode 109. Said processing and control unit 15 is configured to regulate the actuation of the mixing device 3 on the basis of said first electrical signal 106 and/or of said second electrical signal 110.

The processing and control unit 15 can therefore be configured to intervene on the operation of the mixing device 3 in order to increase or decrease the operation of incorporating air into the food liquid as a function of the characteristics of the foam which are detected by the foam sensor 100.

For example, if the foam sensor 100 detects a lack of air bubbles, i.e. a foam in which the liquid phase is excessive, the control unit 15 might intervene on the operation of the mixing means 3 so as to increase the activity thereof.

Advantageously, the mixing device 3 comprises a pump 30 adapted to suck the liquid from the liquid source 13 and the air from the air source 11.

The pump 30 can be a gear pump.

Alternatively, the pump 30 can be a double auger pump, for example like the one described in patent EP3305145.

The pump 30 therefore performs both the function of sucking the liquid and the air and the function of mixing the liquid and the air for making the foam.

As is known, the performance of a pump tends to decrease over time and in particular the priming tends to decrease, hence the air sucked inside the pump, with consequent effects on the making of the foam. The presence of the foam sensor 100, by detecting a reduction in the gas phase of the foam, can intervene by increasing, through the processing and control unit 15, the number of revolutions of the pump 30, thereby compensating for the normal wear of the pump itself and keeping constant the characteristics of the foam that is produced.

Advantageously the device for the production of foam 1 comprises a filter of the air sucked by the pump 30.

As is known, such a priming air filter tends to get clogged over time, with consequent effects on the making of foam. Also in this case, the presence of the foam sensor 100, by detecting a reduction of the gas phase of the foam, allows to compensate for the reduced inflow of air, for example by increasing the number of revolutions of the pump 30 so as to prime more air.

Furthermore, in the case in which the liquid source 13 is running out, the foam sensor 100 would detect an excessive aeration of the foam produced which, through the processing and control unit 15, might generate a warning signal for the replenishment of the liquid source 13.

In an embodiment of the device for the production of foam 1 not illustrated in the accompanying Figures, the mixing device 3 comprises a stirrer member capable of stirring the liquid to cause the incorporation of ambient air and therefore the formation of the foam.

Said stirrer member can be inserted inside a container body adapted to contain also the liquid.

Alternatively, the stirrer member can include a vibrating element placed inside a duct where the liquid flows which, when vibrated, turns into foam.

Advantageously, the device 1 comprises a proportional valve 17 associated with the air source 11 and connected to the processing and control unit 15. The processing and control unit 15 is configured to operate said proportional valve 17 so as to regulate the flow of air coming from the air source 11 on the basis of the first electrical signal 106 and/or the second electrical signal 110.

For example, if the foam sensor 100 detects a lack of air bubbles in the foam, the processing and control unit 15 might intervene on the opening of the proportional valve 17 so as to allow a greater flow of air to the mixing device 3, and therefore a more efficient foam formation.

On the contrary, if the foam sensor 100 detects the presence of too many air bubbles and of excessive size, the processing and control unit 15 might intervene on the opening of the proportional valve 17 so as to reduce the flow of air to the mixing device 3.

Advantageously, the duct 7 through which the foam flows comprises, downstream of the mixing device 3 and upstream of the foam sensor 100, a portion 8 configured to generate a distributed pressure drop of the foam and is therefore adapted to stabilize the foam structure before it passes through the foam sensor 100.

Advantageously, the device for the production of foam 1 also comprises heating means 21 of the foam and/or the food liquid, also connected to the processing and control unit 15. Said processing and control unit 15 is therefore configured to regulate the temperature of the foam and/or liquid through said heating means 21.

As illustrated in FIG. 1, the heating means 21 can be associated with the liquid source 13 and therefore are adapted to heat the liquid, and consequently the foam which is then formed by the mixing device.

As explained in the introduction, the temperature of the liquid, particularly in the case of milk, is a very important factor for making the foam having the desired quality characteristics.

The processing and control unit 15 therefore allows to regulate the activation of the heating means 21, and therefore to heat the liquid, on the basis of the electrical signals 106 and/or 110 detected by the foam sensor 100.

For example, the heating means 21 can comprise a heating plate 210 associated with the container which constitutes the liquid source 13. Alternatively, the heating means 21 can comprise an electrical resistance associated with the liquid source 13.

Figure 2:
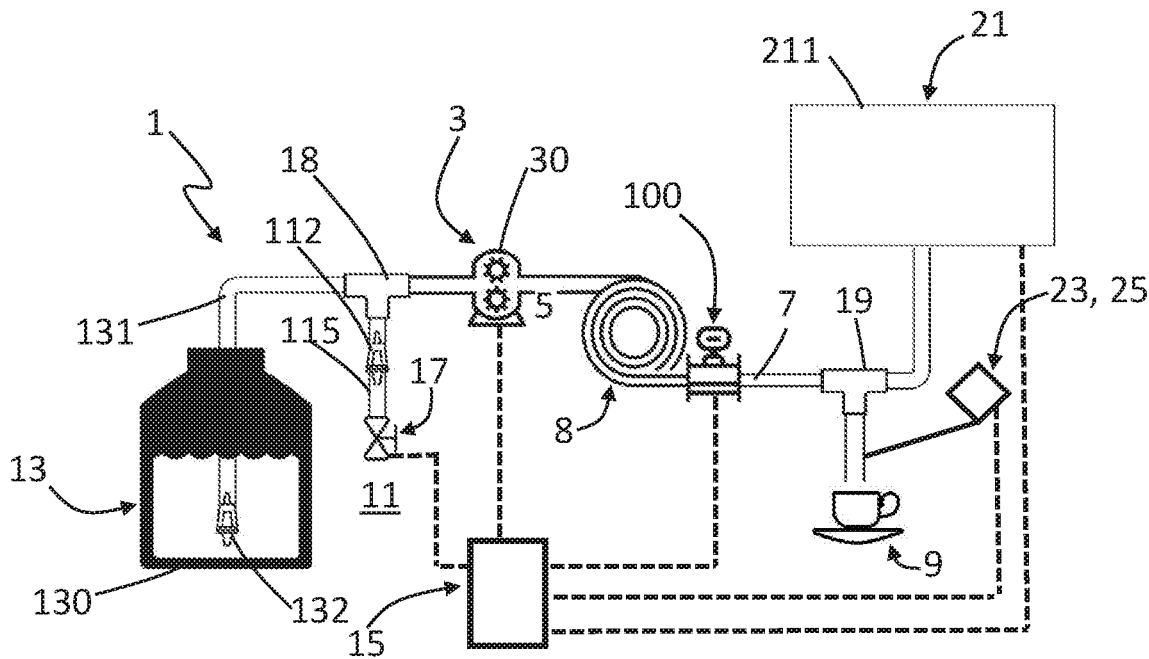
FIG. 2 is a schematic view of a variant of the device for the production of foam of FIG. 1, according to the disclosure.

As illustrated in FIG. 2, the heating means 21 can instead be placed substantially at the point of delivery of the foam to the container 9. Said heating means 21 can be placed upstream or downstream of the foam sensor 100 and are substantially adapted to heat the foam already formed.

Said heating means 21 can comprise a steam heater 211, for example of the type described in patent EP3248519.

Advantageously, the device 1 comprises a temperature sensor 23 and/or a pressure sensor 25 whose measurements can be integrated with those obtained by the foam sensor 100 for a further more accurate measurement of the quality of the foam.

Advantageously, the temperature sensor 23 and/or the pressure sensor 25 are connected to the processing and control unit 15.

The temperature sensor 23 is adapted to detect the temperature of the foam, preferably at the duct 7, and even more preferably near the point of delivery of the foam to the container 9.

Foam temperature is a parameter that can be used to regulate the activation of the heating means 21 in order to obtain a foam at a desired service temperature.

Advantageously, the processing and control unit 15 can also take into account the foam temperature detected by the temperature sensor 23, possibly in correlation with the measurements made by the foam sensor 100, so as to regulate the actuation of the mixing device 3.

The temperature sensor 23 is preferably a thermopile-type sensor.

The temperature sensor 23 provides information on the foam temperature which contributes to controlling the volume of the bubbles present in the foam. In fact, high temperatures increase the internal air pressure making the foam bubbles unstable.

Furthermore, the temperature of the milk foam and/or the milk itself is a parameter of the recipe for the preparation of the beverage, and therefore the detection of the temperature is useful not only for the production of foam, but also for the optimal preparation of the finished product.

Advantageously the pressure sensor 25 allows to know the pressure in the duct 7, or inside other ducts of the foam device 1, so as to be able to define algorithms for detecting the quality of the foam that are more accurate and not dependent on the flow rates of the beverage with foam.

Figure 5:
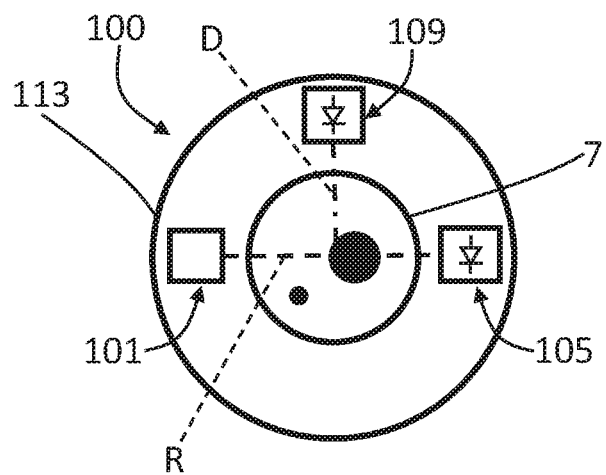
FIG. 5 is a schematic view of a variant of the foam sensor present in the device for the production of foam, according to the disclosure.

Advantageously, as illustrated in FIGS. 4 and 5, the foam sensor 100 comprises a casing 113 crossed by the duct 7 and housing the internal radiation source 101, the first photodiode 105, the second photodiode 109 and the processing and control 15.

In FIG. 4 the second photodiode 109 is illustrated in dashed lines with the meaning that it is placed at a different height than the first photodiode 105.

Preferably, as always illustrated in FIG. 4, the foam sensor 100 comprises a temperature sensor 23 and/or a pressure sensor 25. Advantageously, in fact, the temperature sensor 23 and/or the pressure sensor 25 can be housed in the casing 113 of the foam sensor 100.

In FIG. 5 the casing 113 is substantially annular in shape.

Advantageously, in addition to the two photodiodes 105 and 109, the radiation source 101 is also electrically connected to the processing and control unit 15.

Advantageously, the processing and control unit 15 is configured to sample the electrical signal generated by the first photodiode 105 and/or the second photodiode 109 at a frequency greater than 8 kHz. In this way the sampled signal retains a significant amount of information. Preferably the sampling frequency is between 30 KHz and 70 KHz, and even more preferably it is about 50 KHz. This also keeps the size of the detected data files acceptable.

Said sampling frequencies are particularly adapted to acquire the signals produced by the passage of the foam along a duct 7 having a diameter lower than 10 millimeters, preferably between 3 and 7 millimeters.

In the case of diameters of the duct 7 lower than 5 millimeters, higher sampling frequencies are preferable. Furthermore, the lower the average flow speed of the foam in the duct, the lower the sampling frequencies of the signal.

Advantageously, the liquid source 13 can comprise a container 130 adapted to contain the liquid. The internal volume of said container 130 is advantageously put in fluid communication with the mixing device 3 through a duct 131. Advantageously, a non-return valve 132 is associated with said duct 131.

Advantageously, the air source 11 can comprise an inlet mouth constituted by the proportional valve 17, which is in fluid communication with the mixing device 3 through a duct 115. Advantageously, a non-return valve 112 is associated with said duct 115.

Advantageously, the duct 131 coming from the liquid source 13 and the duct 115 coming from the air source 11 are put into reciprocal communication through a T-connector 18, which carries out a first mixing of liquid and air.

With particular reference to the embodiment illustrated in FIG. 2, a second T-connector 19 can also be provided between the steam heater 211 and the duct 7.

The present disclosure also relates to a foam sensor 100 associable with a duct 7 where a foam of a liquid obtained by mixing a liquid with air or another gas flows according to a flow direction S.

According to the disclosure, the foam sensor 100 comprises:
- a radiation source 101 adapted to generate a radiation 103 which strikes said duct 7 along an irradiation direction R incident to the flow direction;
- a first photodiode 105 placed on the irradiation direction R from a side opposite to the radiation source 101 with respect to the duct 7, the first photodiode 105 generating a first electrical signal 106 dependent on the radiation portion 107 which passes through the foam which flows along the duct 7, or, alternatively,
- a second photodiode 109 placed along a diffusion direction D substantially orthogonal to the irradiation direction R, the second photodiode 109 generating a second electrical signal 110 dependent on the radiation portion 111 which is diffused by the foam along substantially the diffusion direction D.

Advantageously, the foam sensor 100 comprises both the first photodiode 105 and the second photodiode 109.

The foam sensor 100 can also have one or more of all the technical characteristics already described with reference to the device for the production of foam 1.

Advantageously the foam sensor 100 is associated with a duct 7 of a device for the production of foam 1 as described above.

The foam sensor 100 can in any case be associated with any device for the production of foam, provided that in this device there is an area where the foam can flow, such as for example a duct 7.

The operation of the device for the production of foam, with particular reference to the presence of the foam sensor, is briefly described below.

The first photodiode 105, aligned with the radiation source 101 along the irradiation direction R, but from the opposite side of the duct 7, detects the shadow caused by the passage of the bubbles present in the foam and therefore generates a "photogenerated" current that is greater the smaller the bubbles present in the foam, in number and size, are.

The passage of bubbles in fact involves an attenuation of the radiation which passes through the liquid flowing along the duct 7, and therefore a variation of the current signal generated by the first photodiode 105.

The second photodiode 109, placed at 90° with respect to the irradiation direction R, receives instead the diffused radiation, along the diffusion direction D, from the bubbles present in the foam, and does not receive any direct radiation coming from the source 101.

Since the second photodiode 109 is positioned so as to capture only the diffused radiation, it is possible to use a very sensitive photodiode, for example by using a very high gain of the amplifier associated with the photodiode itself, so as to be able to detect the passage of even a single small bubble.

The fact of having two photodiodes 105 and 109 arranged orthogonally and capturing portions 107 and 111 of the radiation 103 that are orthogonal to each other allows to realize a foam sensor 100 having a very wide measurement range before incurring the saturation of the electrical signals generated by both photodiodes 105 and 109.

Advantageously, in the case in which the radiation source comprises a laser source and therefore in the case in which the radiation 103 is constituted by a laser light beam, the first photodiode 105 can also be sensitive to the modulation of the laser light beam power due the effect of the so-called "self-mixing interferometry". Through the analysis of the so-called "self-mix" signal of the first photodiode 105 it is possible to detect the presence of even very small bubbles, which otherwise would not generate a shadow, such that they can be detected by the first photodiode 105 itself in another way.

It has been noted from experimental tests of the foam sensor 100 that the amplitude of the variation of the voltage signal generated by the photodiodes 105 and 109 is dependent on the quantity and size of the bubbles passing at the photodiodes themselves, and thus basically of the quality of the foam.

For example, starting from the calculation of the root mean square value of the voltage signal generated by the first photodiode 105 and/or the second photodiode 109, it is possible to estimate the size of the bubbles and their approximate number.

Advantageously, it is possible to perform more complex signal processing, for example capable of taking into account the non-linear function of the amplitudes of the shadow (with regard to the first photodiode 105) or the diffusion extent (with regard to the second photodiode 109) based on the volume of the bubbles.

For example, it is also possible to perform processing on the frequency spectrum of the signal generated by the photodiodes 105 and/or 109 to obtain parameters that are indicative of the quality of the foam.

The foam sensor 100 is capable of detecting the passage of bubbles but also the passage of particles of various kind possibly present in the foam, such as for example contaminant, or microplastic particles.

Furthermore, the foam sensor 100 is also capable of distinguishing the freshness of the milk used for the production of foam. In fact, the foam sensor 100 is capable of detecting the aggregations of micelles that occur in milk that is no longer fresh or past its use-by date, which aggregations result in anomalies of the signal produced by the first photodiode 105 and/or the second photodiode 109.

In fact, during the passage of a gas bubble there is a change in the refractive radiation index as a function of the subsequent crossing of the liquid-gas and gas-liquid interfaces which leads to the generation of an electrical signal from the photodiodes 105 and/or 109 that is different from the electric signal generated by the passage of a particle, as a result of the different change in the refractive index due to the crossing of the liquid-solid and solid-liquid interfaces and because the solid particles can be opaque and therefore further attenuate the radiation and exhibit a different diffusion.

The foam sensor 100 is also capable of distinguishing the passage of liquids other than milk, such as, for example, cleaning liquids for which can be used in cleaning cycles of the device for the production of the foam 1.

Therefore, it is possible to distinguish the two phenomena by analysing the signal generated by the photodiodes 105 and/or 109.

Advantageously, the signal 106 generated by the first photodiode 105 can be suitably processed, for example by autocorrelation, to estimate the size of the bubbles which pass in front of the photodiode itself.

In fact, the bubble acts as a sort of lens for the radiation 103 that strikes it, leaving a sort of imprint on the photodiode 105.

In particular in the case of larger bubbles, the radiation 103 is deflected by the edges of the bubble itself, which therefore shade the photodiode 105, but passes through the centre of the bubble, thus reaching the photodiode 105.

With algorithms that are capable to distinguish and recognize specific patterns of alternation of lights and shadows it is therefore possible to indirectly measure the size of the bubbles that pass in front of the photodiode 105.

Advantageously, the foam sensor 100 can comprise one or more further photodiodes placed flanked by the first photodiode 105 along a direction parallel to the flow direction S of the foam in the duct 7, which photodiodes are arranged so as to detect in any case the radiation 103 emitted by the radiation source 101.

In this way, being the distance between the photodiodes placed along this direction known, the cross-correlation over time of the signals detected by said photodiodes allows to identify precisely the same event over time, such as for example the passage of a bubble, and therefore to obtain the flow speed of the foam inside the duct 7.

The presence of further photodiodes, flanked both by the first photodiode 105 and the second photodiode 109 along directions parallel to the flow direction S advantageously allows to make more accurate and more robust measurements.

The present disclosure also relates to a method for estimating the quality of a foam obtained by mixing a liquid with air or other gas through a foam sensor 100 as described above, and a method for estimating the quality of a foam obtained by mixing a liquid with air or other gas in a device for the production of foam of a liquid as described above.

According to the disclosure, said method comprises at least a step of detecting the first electric signal 106 generated by the first photodiode 105 and/or the second electric signal 110 generated by the second photodiode 109, and a step of processing said first electric signal 106 and/or said second electrical signal 110 to obtain a measurement of the quantity and size of the bubbles present in a volume of foam, and in particular in the volume of foam which flows through the duct 7 in a given period of time.

Advantageously, the aforementioned method can also comprise the step of calculating the probability density function (PDF) of the distribution of bubbles as a function of the size of the bubbles themselves, for example as a function of their diameter. In this way it is possible to obtain an indication of the degree of stability of the foam. In fact, smaller bubbles tend to coalescence with larger bubbles, thus favouring the dispersion of the gas trapped in the bubbles. On the contrary, the uniform presence of small bubbles gives the foam greater stability, and therefore allows the foam to last in the cup over time.

Advantageously, the foam sensor 100 therefore allows to monitor the stability of the foamed beverage thanks to the possibility of monitoring the PDF of the distribution of the bubbles.

The present disclosure also relates to a method for monitoring a cleaning cycle of a device for the production of foam of a liquid, as described above, comprising the steps of:
   circulating a cleaning liquid in the device (1) itself;
   detecting the first electric signal 106 generated by the first photodiode 105 and/or the second electric signal 110 generated by the second photodiode 109;
   processing said first electrical signal 106 and/or said second electrical signal 110 to obtain a signal indicative of the passage of milk or of the cleaning liquid, or of a mixture of milk and of said cleaning liquid;
   interrupting or continuing the circulation phase of the cleaning liquid on the basis of this signal indicative of the passage of milk or of the cleaning liquid, or of a mixture of milk and of said cleaning liquid.

Advantageously, in fact, the cleaning cycle can be interrupted when the signal is indicative of the passage of only the cleaning liquid, which means that milk residues possibly present in the device 1 have been removed.

In practice it has been found that the device for the production of foam, as well as the relative foam sensor, according to the present disclosure, fulfil the intended task and advantages as they allow to detect the quality characteristics of the foam in a simple, robust and economic way.

Another advantage of the device for the production of foam, according to the disclosure, relates to the fact that the relative foam sensor is capable of directly monitoring the characteristics of the foam at the moment of its delivery, that is when the foam is added to the coffee so as to form the finished product.

A further advantage of the device for the production of foam, according to the disclosure, relates to being able to perform, thanks to the presence of the foam sensor, an automatic in-line calibration of the device itself, without resorting to external equipment.

A further advantage of the device for the production of foam, according to the disclosure, relates to the fact that it is possible to regulate and vary the characteristics of the foam that is produced so as to keep said characteristics constant even when external conditions vary (e.g., temperature variations, variations of the properties of raw materials, wear of the device components).

The characteristics of the foam that can be regulated and varied include, for example: the number and size of the air bubbles, the temperature of the foam, the stiffness of the foam, the texture of the foam, in terms of fluidity and creaminess, the stability of the foam, the uniformity, brilliance, the sensation of melting in the mouth.

A further advantage of the device for the production of foam, according to the disclosure, relates to being able to vary and regulate the characteristics of the foam which is also produced during the single delivery.

In fact, for example, not all the milk that is added to a coffee to form a cappuccino must be in the form of foam, being in fact preferable that part of the milk is added to the coffee with a prevalent liquid phase and part of the milk is added to the coffee as a foam.

Still another advantage of the disclosure relates to the fact that the foam sensor does not require direct contact with the liquid, since it is sufficient for it to pass through an at least partially transparent duct.

Still another advantage of the foam sensor according to the disclosure relates to the fact that it does not have moving parts which tend to reduce the performance of the sensor over time.

Still another advantage relates to the fact that the foam sensor is absolutely inexpensive, and therefore usable on a large scale in any type of application and context, since it substantially includes low-cost and large-consumption diodes or photodiodes.

Still another advantage is the fact that the foam sensor has a good sensitivity and a very high response speed.

Still another advantage of the foam sensor according to the disclosure is the fact that it also detects the presence of contaminant particles in the beverage.

Still another advantage of the foam sensor, according to the disclosure, is detecting the volume in the cup of the delivered substance since it is capable of detecting the speed and flow rate of the liquid phase and of the foamed phase of the delivery.

The device for the foam production of a liquid and the foam sensor thus conceived are susceptible of numerous modifications and variations, all of which are within the scope of the inventive concept.

Furthermore, all the details can be replaced by other technically equivalent elements.

In practice, any materials can be used according to requirements, as long as they are compatible with the specific use, the dimensions and the contingent shapes.

The invention claimed is:

1. A device for production of foam of a liquid, the device comprising:
   a source of a liquid wherein the liquid is one of milk and coffee,
   a source of air or another gas,
   a mixing device in fluid communication with said liquid source and with said air source configured to mix said liquid coming from said liquid source with said air coming from said air source to generate a foam of said liquid, wherein said mixing device comprises one pump adapted to suck said liquid from said liquid source and adapted to suck said air from said air source, mixing the liquid and the air sucked for making the foam, or said mixing device comprises one pump configured for stirring the liquid to cause incorporation of air or gas for making said foam, a duct in fluid communication with said mixing device downstream of said mixing device, said foam flowing along said duct in a flow direction, wherein the device comprises a foam sensor associated with said duct, said foam sensor comprising a radiation source configured to generate a radiation which strikes said duct along an irradiation direction incident to said flow direction, wherein a first portion of said radiation passes through said foam and a second portion of said radiation is diffused by said foam, said foam sensor further comprising: a first photodiode placed on said irradiation direction from a side opposite to said radiation source with respect to said duct, said first photodiode generating a first electrical signal dependent on the first portion of said radiation which passes through said foam which flows along said duct, and a second photodiode placed along a diffusion direction substantially orthogonal to said irradiation direction, said second photodiode generating a second electrical signal dependent on the second portion of said radiation which is diffused by said foam along said diffusion direction, a processing and control unit being configured to process said first electrical signal and said second electrical signal to obtain a measurement of quantity and size of bubbles of said foam which pass in front of said first photodiode and in front of said second photodiode, said processing and control unit being configured to regulate actuation of said mixing device on basis of said first electrical signal and of said second electrical signal, wherein the device comprises a valve associated with said air source and connected to said processing and control unit, said processing and control unit being configured to operate said valve to regulate flow of air coming from said air source on the basis of said first electrical signal and/or of said second electrical signal.

2. The device for production of foam according to claim 1, wherein said foam sensor comprises a casing crossed by said duct and housing said radiation source, said first photodiode, said second photodiode and said processing and control unit.

3. The device for production of foam according to claim 1, wherein said radiation source comprises a laser source, said radiation comprising a laser light beam, said first photodiode detecting the modulation of the power of said laser light beam caused by a retro-injection interferometry effect.

4. The device for production of foam according to claim 1, wherein said duct comprises, downstream of said mixing device and upstream of said foam sensor, a portion configured to generate a distributed pressure drop of said foam.

5. The device for production of foam, according to claim 1, wherein said device comprises a heating means of said foam and/or of said liquid, connected to said processing and control unit, said processing and control unit being configured to regulate the temperature of said foam and/or of said liquid through said heating means.

6. The device for production of foam according to claim 5, wherein said device further comprises a temperature sensor connected to said processing and control unit.

7. The device for production of foam according to claim 1, wherein said processing and control unit is configured to sample said first electrical signal generated by said first photodiode and/or said second electrical signal generated by said second photodiode at a frequency greater than 8 kHz.

* * * * *